(12) United States Patent
Bucknell et al.

(10) Patent No.: US 8,885,542 B2
(45) Date of Patent: Nov. 11, 2014

(54) QUALITY OF SERVICE CONTROL IN A RELAY

(75) Inventors: Paul Bucknell, Brighton (GB); Zhaojun Li, Guildford Surrey (GB)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/483,690

(22) Filed: May 30, 2012

(65) Prior Publication Data

US 2012/0236782 A1   Sep. 20, 2012

Related U.S. Application Data

(63) Continuation of application No. PCT/GB2009/002940, filed on Dec. 22, 2009.

(51) Int. Cl.
*H04B 7/14* (2006.01)
*H04B 7/155* (2006.01)
*H04W 72/12* (2009.01)
*H04B 7/26* (2006.01)
*H04W 84/04* (2009.01)

(52) U.S. Cl.
CPC ........... *H04B 7/155* (2013.01); *H04W 72/1221* (2013.01); *H04B 7/2606* (2013.01); *H04W 84/047* (2013.01)
USPC ....................................................... 370/315

(58) Field of Classification Search
USPC ................. 370/313, 315, 328, 329, 231, 252; 455/434, 436
See application file for complete search history.

(56) References Cited

U.S. PATENT DOCUMENTS

| 2009/0191882 | A1 | 7/2009 | Kovacs et al. | |
|---|---|---|---|---|
| 2009/0196177 | A1* | 8/2009 | Teyeb et al. | 370/231 |
| 2009/0313676 | A1 | 12/2009 | Takeshima et al. | |
| 2010/0103857 | A1* | 4/2010 | Ulupinar et al. | 370/313 |
| 2010/0103863 | A1* | 4/2010 | Ulupinar et al. | 370/315 |
| 2012/0014281 | A1* | 1/2012 | Chun et al. | 370/252 |
| 2012/0033606 | A1* | 2/2012 | Chun et al. | 370/315 |

FOREIGN PATENT DOCUMENTS

| CN | 101395871 A | 3/2009 |
|---|---|---|
| EP | 1916782 | 4/2008 |
| EP | 2066084 | 6/2009 |

(Continued)

OTHER PUBLICATIONS

Notification of Reason(s) for Refusal issued for corresponding Japanese Patent Application No. 2012-545421, mailed Aug. 27, 2013, with English translation.

(Continued)

*Primary Examiner* — Hassan Phillips
*Assistant Examiner* — Ajay Cattungal
(74) *Attorney, Agent, or Firm* — Myers Wolin, LLC

(57) ABSTRACT

A method in a communications system in which a plurality of user equipments are transmitting data to a donor node via a relay node, the plurality of user equipments each storing the data in its own UE buffer prior to transmission to the relay node, the relay node storing the data received from the plurality of user equipments in a relay buffer prior to transmission to the donor node. The method comprises at the relay node, sending a relay buffer status report from the relay node to the donor node when a buffered data value passes a threshold value. The buffered data value representing either data stored in the UE buffers or data stored in the relay buffer.

13 Claims, 10 Drawing Sheets

(56) References Cited

FOREIGN PATENT DOCUMENTS

| | | |
|---|---|---|
| EP | 2075965 | 7/2009 |
| WO | 2006/109151 | 10/2006 |
| WO | 2007/077476 | 7/2007 |
| WO | 2007/138046 | 12/2007 |
| WO | 2008/003722 | 1/2008 |
| WO | 2008/051605 | 5/2008 |
| WO | 2008/087169 | 7/2008 |
| WO | 2008/132692 | 11/2008 |
| WO | 2008/156549 | 12/2008 |

OTHER PUBLICATIONS

Digital cellular telecommunications system (Phase 2+); Universal Mobile Telecommunications System (UMTS); LTE; "Policy and charging control architecture (3GPP TS 23.203 version 8.7.0 Release 8)"; ETSI TS 123 203 V8.7.0; Sep. 2009.

ETRI; "Consideration on MAC procedures for Un interface"; Agenda Item: 7.4 Relays; 3GPP TSG RAN WG2 #67; R2-094619 (R2-093751); Aug. 24-28, 2009.

International search report with written opinion issued for corresponding European Patent Application No. PCT/GB2009/002940 mailed Sep. 20, 2010.

Notification of Reason(s) for Refusal issued for corresponding Japanese Patent Application No. 2012-545421, dated Apr. 8, 2014, with English translation.

First Notification of Office Action issued for corresponding Chinese patent application No. 200980161939.3, issued Mar. 5, 2014, with English translation.

\* cited by examiner

QUALITY OF SERVICE CONTROL IN A RELAY

This is a continuation of International Patent Application No. PCT/GB2009/002940, filed on Dec. 22, 2009, now pending, the contents of which are herein wholly incorporated by reference.

This invention generally relates to a mobile communications system and in particular, to a method of transmitting and receiving data using relays. Relays provide the same functionality as conventional base stations, but the link to the network is provided, for example, by using the same radio interface as used by the mobile devices that connect to the relay.

The invention may be used in communications systems operating according to OFDMA systems such as those used in WiMAX; Universal Mobile Telecommunications System (UMTS); Code Division Multiple Access (CDMA) protocols; the GSM EDGE Radio Access Network (GERAN); or other telecommunications protocols. Specifically, the invention may be used in telecommunications protocols in which relay stations are used between a user equipment and a base station in the transmission of data.

One particular application is in UMTS, also known as 3G. UMTS wireless communication systems are being deployed worldwide. Future development of UMTS systems is centred on the so-called evolved UMTS terrestrial radio access network (evolved UTRAN or eUTRAN), more commonly referred to by the project name Long Term Evolution (LTE).

LTE is a technology for the delivery of high speed data services with increased data rates for the users. Compared to UMTS and previous generations of mobile communications standards, LTE will also offer reduced delays, increased cell edge coverage, reduced cost per bit, flexible spectrum usage and multi-radio access technology mobility.

LTE has been designed to give peak data rates in the downlink (DL) direction, communication away from a base station (BS) towards a user equipment, of >100 Mbps, whilst in the uplink (UL) direction, communication away from the user equipment towards the BS, of >50 Mbps.

LTE-Advanced (LTE-A), which is a development currently being standardized, will further improve the LTE system to allow up to 1 GBps in the downlink and 500 Mbps in the uplink. LTE-A will use new techniques to improve the performance over existing LTE systems, particular for the transmission of higher data rates and improvements to cell edge coverage.

LTE-Advanced and LTE share a common basic architecture and network protocol architecture. As in current UMTS systems, the basic architecture proposed for LTE consists of a radio access network (the eUTRAN) connecting users (or more precisely, user equipments) to access nodes acting as base stations, these access nodes in turn being linked to a core network. In eUTRAN terminology the access node is called an enhanced Node Basestation or eNB. A separate radio network controller (RNC) as used in previously-proposed systems is no longer required, with some of its functions being incorporated into the eNB, some into the Mobility Management Entity (MME), and some into the System Architecture Evolution GateWay (SAE GW). The eNBs connect to the core network which, in LTE, is referred to as the evolved packet core (EPC).

FIG. 1 shows the relationship between protocol layers for LTE. The Packet Data Convergence Protocol (PDCP) is the top sublayer of the LTE layer 2 (the layer of the protocol stack between the IP layer and the physical layer) protocol stack, above the Radio Link Control (RLC) layer. The PDCP layer processes control plane messages, such as Radio Resource Control (RRC) messages, in the control plane and user plane packets, such as Internet Protocol (IP) packets, in the user plane. Depending on the radio bearer, the main functions of the PDCP layer are header compression, security (integrity protection and ciphering), and support for reordering and retransmission during handover. PDCP packets include a Sequence Number (SN) that enables in-order delivery of packets to the upper layers and identification of missing packets with potential re-transmission of those missing packets. Sequence numbers are also used for security in ciphering of the user plane and control plane, and additionally for integrity protection of RRC data in the control plane. An equivalent protocol structure exists in the UMTS protocol.

FIG. 2 illustrates the network topology between the user equipment 110, two enhanced Node Basestations 120, 121, and the Serving GateWay 130 (SGW or S-GW). The Uu radio interface is marked, corresponding to the dashed line marked 'Uu' in FIG. 1, likewise the S1-U interface marked on FIG. 2 corresponds to the dashed line marked 'S1-U' in FIG. 1. The user equipment 110 and eNB 120 communicate over the Uu radio interface. The two eNBs 120 and 121 communicate with one another via a wired X2 interface.

LTE-Advanced extends LTE Rel-8 by providing support for relaying as a tool to improve data throughput to user equipment at the cell edge. Relaying can also improve group mobility, temporary network deployment, and/or provide coverage in new areas. LTE-Advanced is used as an illustrative example, but relaying is supported in other telecommunications protocols, for example, a similar relaying technique exists in the IEEE standard 802.16j.

FIG. 3 shows the network topology in a configuration in which the user equipment 110 communicates with a Donor enhanced Node Basestation (DeNB) 120 via a relay node 140. The user equipment 110 communicates with the relay node 140 over the Uu radio interface. The relay node 140 communicates with the DeNB 120 over the Un radio interface. The DeNB 120 and eNB 121 communicate via an X2 interface. The DeNB 120 and the eNB 121 each communicate with the sGW 130 via an S1-U interface.

Over the two radio interfaces (Uu and Un), user data traffic is transported using the User-Plane (that consists of Packet Data Convergence Protocol (PDCP), Radio Link Control (RLC), Medium Access Control (MAC) and PHYsical (PHY) protocol layers).

Relay node 140 wirelessly connects to the radio access network via a donor node 120 serving a donor cell. LTE-A in particular provides support for relay nodes with an 'inband' connection, in which the network-to-relay link shares the same frequency band as direct network-to-UE links within the donor cell served by the donor node. Other telecommunications protocols may also support 'outband' connections, in which the network-to-relay link does not operate in the same band as direct network-to-UE links within the donor cell served by the donor node. Specifically, LTE-A supports 'type 1' relay nodes. A type 1 relay node is characterised by the following, as set out in TR 36.912 ("Feasibility Study for Further Enhancements for E-UTRA (LTE-Advanced)"):

it controls one or more cells, each of which appears to a user equipment as a separate cell distinct from the donor cell;

the one or more cells shall have their own Physical Cell ID (defined in LTE Rel-8) and transmit their own synchronization channels, reference symbols and other parameters;

in the context of single-cell operation, the user equipment receives scheduling information and HARQ feedback directly from the relay node and sends its control channels (SR/CQI/ACK) to the relay node.

In this specification the term 'bearer' is taken to mean a stream of data between two points defined by a set of parameters. Bearer may encompass 'radio bearer', which is taken to mean a radio stream between two points defined by a set of parameters. Bearers may be distinguished from one another by their end points, and by a label representing their defining parameters, such as a QoS label. A bearer may contain more than one data stream if, for example, the data streams have a common QoS label.

Typically, multiple applications may be running in a user equipment at the same time, each one requiring data to be transmitted to the donor node via the relay node, and data to be received from the donor node via the relay node. For example, a user may be engaged in a VoIP (Voice over IP) call while at the same time browsing a web page or downloading a file using an FTP (File transfer Protocol) application (which may require acknowledgment messages to be sent from the user equipment to the donor node). VoIP has more stringent requirements for Quality of Service (QoS) in terms of delay and delay jitter than web browsing and FTP, while the latter requires a much lower packet loss rate. In order to support multiple QoS requirements, different bearers are set up for the user equipment within the network architecture, each being associated with a particular QoS label. Broadly, bearers can be classified into two categories based on the nature of the QoS they provide:

Minimum Guaranteed Bit Rate (GBR) bearers, which can be used for applications such as VoIP. These have an associated GBR value for which dedicated transmission resources are permanently allocated (e.g. by an admission control function in the eNodeB) during the bearer establishment/modification procedures. Bit rates higher than the GBR may be allowed for a GBR bearer if resources are available. In such cases, a Maximum Bit Rate (MBR) parameter, which can also be associated with a GBR bearer, sets an upper limit on the bit rate which can be expected from a GBR bearer.

Non-GBR bearers, which do not guarantee any particular bit rate. These can be used for applications such as web browsing or FTP transfer. For these bearers, no bandwidth resources are allocated permanently to the bearer. In the access network, it is the responsibility of the eNodeB to ensure the necessary QoS for a bearer over the radio interface. Each bearer has an associated QoS Class Identifier (QCI), and an Allocation and Retention Priority (ARP). Each QCI is characterized by priority, packet delay budget and acceptable packet loss rate. The QCI label for a bearer determines how it is handled in the eNodeB. The set of standardized QCIs and their characteristics (from which the Policy Charging Rule Function (PCRF) in an EPS can select) is provided in Table 1 (from Section 6.1.7, in '3GPP Technical Specification 23.203, 'Policy and charging control architecture (Release 8)'). The QCI table specifies values for the priority handling, acceptable delay budget and packet error loss rate for each QCI label (QoS Class Identifier).

TABLE 1

Standardized QoS Class Identifiers (QCIs) for LTE

| QCI | GBR type | Priority | Delay budget (ms) | Packet loss rate | Example services |
|---|---|---|---|---|---|
| 1 | GBR | 2 | 100 | $10^{-2}$ | Conversational voice |
| 2 | GBR | 4 | 150 | $10^{-3}$ | Conversational video (live streaming) |
| 3 | GBR | 5 | 300 | $10^{-6}$ | Non-conversational video (buffered streaming) |
| 4 | GBR | 3 | 50 | $10^{-3}$ | Real time gaming |
| 5 | Non-GBR | 1 | 100 | $10^{-6}$ | IMS signalling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP-based (e.g. WWW, e-mail) chat, FTP, p2p file sharing, progressive video, etc. |
| 9 | Non-GBR | 9 | 300 | $10^{-6}$ | |

The priority and packet delay budget (and to some extent the acceptable packet loss rate) from the QCI label determine the RLC mode configuration, and how the scheduler in the MAC handles packets sent over the bearer (e.g. in terms of scheduling policy, queue management policy and rate shaping policy). The RLC mode can either be transparent mode, which has no RLC overhead and is used, for example for broadcast SI messages, acknowledged mode (AM) in which the network component receiving a data packet acknowledges receipt, and unacknowledged mode (UM) in which receipt of data packets is not acknowledged.

For example, a packet with a higher priority can be expected to be scheduled before a packet with lower priority. For bearers with a low acceptable loss rate, an Acknowledged Mode (AM) can be used within the RLC protocol layer to ensure that packets are delivered successfully across the radio interface. The ARP of a bearer is used for call admission control—i.e. to decide whether or not the requested bearer should be established in case of radio congestion. It also governs the prioritization of the bearer for pre-emption with respect to a new bearer establishment request. Once successfully established, a bearer's ARP does not have any impact on the bearer-level packet forwarding treatment (e.g. for scheduling and rate control). Such packet forwarding treatment should be solely determined by the other bearer level QoS parameters such as QCI, GBR and MBR.

FIG. 4 illustrates the use of bearers in a conventional LTE/System Architecture Evolution (SAE) system. There is no relay node in this example. The interfaces between different network components or nodes are denoted by dashed lines. An Evolved Packet System (EPS) bearer has to cross multiple interfaces, namely the S5/S8 interface from the Packet Gateway (P-GW) to the S-GW, the S1 interface from the S-GW to the eNodeB, and the radio interface (also known as the Uu interface) from the eNodeB to the UE. Across each interface, the EPS bearer is mapped onto a lower layer bearer, each with its own bearer identity. Each node must keep track of the binding between the bearer IDs across its different interfaces. For example, An S5/S8 bearer transports the packets of an EPS bearer between a P-GW and a S-GW. The S-GW stores a one-to-one mapping between an S1 bearer and an S5/S8 bearer. The bearer is identified by the GTP tunnel ID across both interfaces.

The end-to-end service is provided by an EPS bearer bound to an external bearer by the P-GW. The EPS bearer is provided by an S5/S8 bearer bound to an E-UTRAN Radio Access Bearer (E-RAB) by the S-GW. In turn, the E-RAB is provided by an S1 bearer bound to a radio bearer by the eNodeB. The LTE architecture is used in this example to illustrate the concept of a bearer, but it should be understood that similar architectures exist in other communications standards or protocols.

FIG. 5 exemplifies the messaging required to set up a bearer, using a conventional LTE/SAE bearer establishment process as an example. There is no relay node in this example. The MME builds a set of session management configuration information including the UL Traffic Flow Template (TFT) and the EPS bearer identity, and includes it in the 'Bearer Setup Request' message which it sends to the eNodeB (message 4 in FIG. 5). The session management configuration is Non-Access Stratum (NAS) information and is therefore sent transparently by the eNodeB to the UE. The Bearer Setup Request also provides the QoS requirements of the bearer to the eNodeB; this information is used by the eNodeB for call admission control and also to ensure the necessary QoS by appropriate scheduling of the user's IP packets. The eNodeB maps the EPS bearer QoS to the radio bearer QoS. It then signals a 'RRC Connection Reconfiguration' message (including the radio bearer QoS, session management configuration and EPS radio bearer identity) to the UE to set up the radio bearer (message 4 in FIG. 5). The RRC Connection Reconfiguration message contains all the configuration parameters for the radio interface. This is mainly for the configuration of the Layer 2 (the PDCP, RLC and MAC parameters), but also the Layer 1 parameters required for the UE to initialize the protocol stack.

In this specification, the handling of bearers in communications systems in which the user equipment is communicating with a base station via a relay, or relay node, is considered. Specifically, the specification addresses how the rapidly changing QoS requirements for the user equipments connected to the relay can be accommodated in the QoS requirements for the interface between the relay and base station.

R2-094634 (3GPP TSG-RAN WG2 #67, 24-29 Aug. 2009, Shenzhen, China, "Discussion on Alternatives on Relay", LG Electronics), forming part of discussions on the establishment of the LTE-A standard, discusses the use of GBR and MBR parameters for bearers. R2-094634 disclose that, for a given UE, the QoS parameter may be semi-static during a call. However, for a RN which should continuously manage incoming and outgoing UEs, the QoS parameters for a operating Un bearer (between the RN and eNodeB) will not be semi-static. When a new UE under a RN's control starts or ends a call, GBR and MBR parameters should be updated not only between RN and DeNB but also between DeNB and the EPC.

R2-094634 further discloses that careful treatment should be provided for VoIP services as is provided in (LTE) Rel-8. Because of the additional hop, the delay over air interfaces will be more critical for VoIP with RN. Accordingly, whenever a number of VoIP calls that the RN handles changes, this change should immediately be mirrored into parameter changes over Un interface.

R2-094619 (3GPP TSG RAN WG2 #67, 24-28 Aug. 2009, Shenzhen, China, "Consideration on MAC procedures for Un interface", ETRI) proposes that a buffer status report (BSR) procedure is performed to provide information about the amount of data in the uplink buffers of the UE. The normal MAC (Media Access Control) procedures on the Un interface allow relays to provide their buffer status to the DeNB for uplink backhauling. However, this procedure can only be triggered after UE UL data have arrived in the relay's uplink buffers and the relay reports buffer status by calculating the buffered data size. In order to minimize relaying latency of uplink data transmission arising from reporting, R2-094619 suggests that the relay could start the BSR procedure earlier than allowed following the current MAC specifications.

R2-094619 proposes that a relay triggers a BSR procedure immediately after the relay receives a BSR from a UE. Also, that the relay transmits a BSR which includes not only information about buffered data, but also BSR information received from the UEs. The UE's data which is associated with the BSR can have arrived in the relay's uplink buffers at the time the relay receives uplink grant from DeNB. Since the BSR shows the amount of UE data available for transmission, the relay could guarantee the handling of the transmission unless an exceptional error occurs. Hence, the relay could forward UE's uplink data more quickly cooperating with DeNB scheduling.

According to an embodiment of a first aspect of the present invention, a method is provided in a communications system in which a plurality of user equipments are transmitting data uplink to a donor node via a relay node, the plurality of user equipments each storing the data in its own UE buffer prior to transmission to the relay node, the relay node storing the data received from the plurality of user equipments in a relay buffer prior to transmission to the donor node. The method comprises, at the relay node, sending a relay buffer status report from the relay node to the donor node when a buffered data value passes a threshold value, wherein the buffered data value represents either data stored in the UE buffers or data stored in the relay buffer.

Advantageously, only sending a relay buffer status report to the donor node once a threshold value has been exceeded saves on signalling overheads. The threshold can be set so that it is at a point where the buffered data value is such that it is necessary or desirable to change transmission characteristics or radio resources allocated to transmitting data from the relay node to the donor node.

The communications system may be a wired or wireless communications system, though in further embodiments some features may be restricted to use in wireless communications systems. In particular, the communications system is suitable to operate according to the LTE-Advanced communications protocol. In the case of the LTE-Advanced protocol, the donor node is an eNB access node. As a further alternative, it may be that the communications system is operating in a mixed network including LTE eNBS and LTE-A eNBs.

In preferred embodiments, there is a radio interface between the relay node and the donor node, and between each of the plurality of user equipments and the relay node, so that data transmission between those components is by radio wave.

The user equipment may be a mobile terminal, such as a telephone or PDA, but is not limited to such devices. For example, a desktop type personal computer may join such a communications system as a user equipment.

The relay node may share the same frequency band as direct donor node to user equipment links within a donor cell served by the donor node. In this way, the donor node is effectively donating some bandwidth for use by the relay node. From the perspective of the user equipment, the relay node provides the same or similar functionality as a base station or other access node, but the link to the network is provided by using the same radio interface as used by the user equipments that connect to that relay. The donor node is a base station communicating with user equipments via a relay or relay node.

Each user equipment has at least one UE data buffer in which to store data prior to transmission to the donor node. A user equipment may have more than one UE data buffer when, for example, two different types of data are being sent to the relay node, such as Voice over IP (VoIP) data, and packet acknowledgments for downloaded emails.

Depending on the particular embodiment, the buffered data value can represent either an amount of data stored in the UE data buffers or an amount of data stored in the relay data buffer. In either case, the comparison with a threshold value is performed by the relay node. Optionally, the relay node maintains a buffered data amount value representing an amount of data stored in the UE data buffers based on UE buffer status reports transmitted from the plurality of user equipments to the relay node. The user equipments may send UE buffer status reports to the relay node due to a particular event trigger, for example, a particular UE may send a UE buffer status report because the amount of data stored in one of the UE data buffers at that user equipment would take more than a predetermined amount of time to transmit to the relay node. Alternatively, UE buffer status reports may be sent periodically in order to provide an indication to the relay node of the amount of data in each of the UE data buffers at a particular user equipment. The period between such periodical UE buffer status reports may be fixed or may be dynamic according to the environment in the communications system.

Alternatively, the buffered data value will not represent an amount of data, but may represent an increase or decrease in the amount of buffered data over a given length of time, or some other property of the buffered data, such as age.

The buffer status report may contain information about the amount of buffered data in the relay buffer, in the UE buffers, or a combination of both.

Preferably, a user equipment will transmit UE buffer status reports to the relay node both periodically and due to a trigger event occurring. Furthermore, it is preferable for the UE buffer status report to contain an indication of the amount of data in each UE data buffer, and for that identification to be accompanied by a means of identifying the particular UE data buffer. For example this way of identifying the buffer could be the DRB (data radio bearer) ID or possibly logical channel ID over the Uu interface for an application session of a UE.

Optionally, there is an upper and a lower threshold value, so that the lower threshold is passed when the buffered data value drops below a lower threshold, and the upper threshold value is passed when the buffered data value exceeds the upper threshold. Alternatively, the threshold value could define a rate of change (scalar or directional) of the buffered data value which cannot be exceeded. The rate of change could be with respect to time, or with respect to the number of user equipments in the communications system.

Preferably, the buffered data value represents a combination of the data stored in the UE buffers and data stored in the relay buffer. The combination of these amounts (or a scaled/normalised representation thereof) provides an accurate indication of forthcoming volumes of data to be transmitted from the relay node to the donor node, and hence sending a buffer status report message to the donor node only when the combined value passes a threshold may be a more efficient reporting procedure.

Combining the two values may be simply by addition of the total amount of data in the UE buffers and the amount of data in the relay buffer. Alternatively, the values may be combined as a scaled representation of the amounts. As discussed above, the relay node may rely on reporting from the plurality of user equipments for information about the amount of data in the UE buffers, and therefore the relay node may not have an accurate contemporaneous value for the amount of data in the UE buffers. However, in this specification the value held by the relay node as the amount of data in the UE buffers shall be considered to be the amount of data in the UE buffers.

Optionally, there may separate threshold values for the amount of data in the UE buffers and for the amount of data in the relay buffer, so that a buffer status report is sent when either or both pass the threshold.

Optionally, the relay node generates a report containing the buffered data value, being either the amount of data in the UE buffers, the amount of data in the relay buffer, or a combination of the two, and only transmits the report to the donor node once a threshold is exceeded. The value contained in the report may be updated periodically, when relevant buffer reports are received from the user equipments, or according to some other trigger.

Preferably, the method further comprises, at the donor node, receiving the relay buffer status report, and adjusting, based on the received relay buffer status report, relay to donor transmission characteristics defining the transmission of data from the relay node to the donor node.

Advantageously, the reporting scheme proposed by the present invention is efficient in terms of use of signalling overheads, in that a buffer status report is only sent from the relay node to the donor node when a threshold is exceeded, and hence a change in the transmission characteristics may be required. For example, the amount of a certain type of data buffered for transmission in the user equipments and/or at the relay may be large and hence extra radio resources and an adjustment in the transmission characteristics is required. Alternatively, the amount of buffered data may be small, in which case the radio resources allocated may be reduced, and the transmission parameters adjusted accordingly.

The donor node may adjust relay to donor transmission characteristics based on the content of the buffer status report. The content may indicate the amount of data in the UE buffers, or the amount of data in the relay buffers, or both. The adjusted transmission characteristics may be, for example, the bandwidth dedicated to transmission from the donor node to the relay node, or it could be that a guaranteed bit rate between the two nodes is adjusted, and that in turn leads to a change in the allocated radio resources.

In preferred embodiments, the data transmitted from each of the plurality of user equipments to the relay node is transmitted in a data stream established having a set of UE transmission characteristics for the data stream, including a quality of service requirement. In this case, the method further comprises, for each new data stream, defining the set of UE transmission characteristics, and transmitting from the relay node to the donor node information representing the defined set of UE transmission characteristics.

Data streams may be bearers, and can be distinguished from one another by their end points, or by some other characteristic defining the data stream, such as a quality of service requirement. The data in the data stream may be a series of sequentially marked packets. Data packets transmitted in a stream may include some label or indication of the characteristics defining the stream. The data stream, once established, will remain established until the end of the relevant data transfer session, for example, the end of a VoIP call, or the end of a file transfer over FTP.

The UE transmission characteristics may include one or more quality of service requirements. A quality of service requirement may be, for example, a minimum delay time for example from end point to end point, a priority level, an acceptable packet loss rate, a guaranteed bit rate, a maximum bit rate, a minimum delay variation or a minimum mean delay.

The information representing the established UE characteristics may be the entire set of established UE characteristics, or it may be a reduced version, including a summary or a label. For example, there may be a pre-defined set of characteristics which both the relay node and the donor node are aware can be labelled in a certain way. Alternatively, depending on the particular embodiment, it may be that the donor node only requires certain information, such as GBRs and MBRs.

Alternatively, the relay node may be able to associate a certain label included in the data stream with a known transmission characteristics or set of characteristics, and transmit relevant information to the donor node accordingly.

While a data stream may be considered to cross several interfaces, the data stream may be transmitted over a particular interface via a bearer, for example, a radio bearer, and then the data stream may be grouped with other similar data streams into another bearer for transmission over the next interface. The radio bearer may have the same quality of service requirements as the data stream or data streams therein. One radio bearer may be used per data stream, or, for example between the relay node and donor node, several data streams having the same quality of service requirements may be grouped or multiplexed into the same radio bearer. These data streams may have arrived at the relay node in individual radio bearers from their respective user equipments.

In particular, invention embodiments may further comprise, at the relay node, for each set of UE transmission characteristics, selecting a QoS label from a set of QoS labels according to the quality of service requirement of the new data stream, and transmitting the QoS label from the relay node to the donor node as information representing the defined set of UE transmission characteristics.

Advantageously, this provides an efficient way of signalling to the donor node the composition of currently active data streams in the communications system. Of course, the donor node is made aware when a user equipment leaves the communications system or a data stream ends, for example, at the end of a call or after downloading a file via FTP, and can adjust its overall view of the active data streams accordingly.

Maintaining at the donor node a statistic or set of statistics representing the active data streams and transmission characteristics enables the donor node to allocate resources and alter transmission characteristics according to the number and type of data streams between the relay node and user equipments.

It may be that data streams are transmitted via radio bearers from the relay node to the donor node according to the QoS label used to summarise the particular quality of service requirements of those data streams. Data streams having similar quality of service requirements can then be transmitted from node to node via a radio bearer itself having transmission characteristics appropriate to the QoS requirements of the data streams therein.

Preferably, methods embodying the present invention include at the donor node, providing a threshold value based on the QoS labels of currently established data streams for use as the threshold value at the relay node, and transmitting the threshold value to the relay node.

The threshold value at the relay node may be any of the different types of threshold values described above. For example, it could be an upper or lower threshold, or a threshold on a rate of change. The threshold values could be intended for comparison with any type of buffered data value, for example, a rate or an amount, or a buffered data value representing either or both of UE buffers and the relay buffer.

A currently established data stream is a data stream that has been established and is transmitting data, or the transmission characteristics are still established and there is some pause in the data transmission. A data stream ceases to be established at the end of the session for which it was established, for example, at the end of a VoIP call, or when a file transfer over FTP is complete. The donor node is made aware when a data stream ceases to be established so that an accurate overall picture of the currently established data streams can be maintained.

It is preferable for the threshold value to be provided each time the donor node is notified of a change in the number of currently established data streams. For example, if the number of data streams increases, an upper threshold on the amount of data in the UE buffers which needs to be passed for a buffer status report to be sent to the donor node could be increased.

In preferred embodiments, each user equipment has a UE buffer dedicated to each data stream from that user equipment to the relay node, and the relay node has a buffer for each different QoS label of currently established data streams.

Each user equipment may have more than one established data stream in which data is being transmitted to the relay node. For example, a user may be participating in a VoIP call and have a data stream for voice data, and be downloading emails from a server and have a data stream for packet acknowledgments. As a further example, a user may be streaming video at the same time as making/receiving voice calls; or watching mobile TV at the same time as using any other traditional applications of Default IP Networks (e.g. Internet surfing) or making/receiving a voice call. A user equipment may therefore have a UE buffer for each data stream. Given that these data streams have different quality of service requirements, a different radio bearer may be used for each, hence the distinct buffers. Each user buffer has associated transmission characteristics, those being the established set of transmission characteristics for the data stream in which data from the buffer is sent. Accordingly, a QoS label or other classification may be applied to those transmission characteristics, and each user buffer may therefore be considered to have a QoS label.

Preferred embodiments further comprise, for each buffer at the relay node, at the donor node, providing a threshold value based on the QoS labels of currently established data streams, and transmitting the threshold value to the relay node. In this case, the buffer status report is transmitted from the relay node to the donor node when a QoS label-specific buffered data value passes the threshold value provided for the relay buffer having the same QoS label, the QoS label-specific buffered data value representing data stored in the UE data buffers dedicated to data streams having a particular QoS label, or data stored in the relay buffer having the same QoS label, or a combination of the two.

Advantageously, providing a threshold dedicated to each relay buffer means a different threshold value is provided for each QoS labels. It may be that more than one threshold value is provided for each QoS label, for example as described above, there could be upper and lower thresholds. Providing a threshold value or values for each QoS labels enables the donor node to take into account the particular requirements or characteristics represented by each of the QoS labels when setting thresholds. For example, if data streams are grouped into radio bearers according to their QoS labels for transmission for the relay node to the donor node, it is preferable to adjust the bandwidth dedicated to a given radio bearer when a value representing the buffers feeding into that radio bearer pass a threshold. Certain QoS labels may require frequent adjustment of bandwidth between the relay node and donor node, in which case the thresholds may be set so that they are passed when only a small increase or decrease from a typical level of data in the buffers is detected.

The QoS label-specific buffered data value may represent an amount of data, or it may represent, for example, a rate. The relationship between the QoS label-specific buffered data value and the relevant threshold value should be considered in the same terms as that between the buffered data value and the threshold value discussed above, so that any options or alternatives discussed above is also applicable here.

As discussed above, the donor node is informed of the transmission characteristics or QoS label of data streams when they are established, and is hence aware of the number of currently established data streams having each QoS label. Each time this information changes, the donor node may redefine some or all of the threshold values, and transmit these new values to the relay node.

According to embodiments of another aspect of the present invention, a communications system is provided comprising a plurality of user equipments each having a UE buffer, a relay node having a relay buffer, and a donor node. Each user equipment is operable to transmit data uplink to the donor node via the relay node, and to store the data in its own UE buffer prior to transmission to the relay node. The relay node is operable to store the data received from the plurality of user equipments in the relay buffer prior to transmission to the donor node, and, when a buffered data value passes a threshold value, to send a buffer status report to the donor node, the buffered data value representing either the data in the UE buffers, or the data in the relay buffer.

According to embodiments of another aspect of the present invention, a relay node is provided for use in a communications system also having a plurality of user equipments each having a UE buffer in which to store data prior to transmission uplink to the relay node, and a donor node. The relay node having a relay buffer, and being operable to receive data from each of the plurality of user equipments for transmission to the donor node, to store the data in the relay buffer prior to transmission to the donor node, and when a buffered data value passes a threshold value, to send a buffer status report to the donor node, the buffered data value representing either the data in the UE buffers, or the data in the relay buffer.

According to embodiments of another aspect of the present invention, a donor node is provided for use in a communications system also having a plurality of user equipments each having a UE buffer for storing data prior to transmission uplink to the relay node, and a relay node having a relay buffer for storing the data prior to transmission to the donor node. The donor node is operable to provide and transmit to the relay node a threshold value which, when passed by a buffered data value, triggers the relay node to send a buffer status report to the donor node, the buffered data value representing either the data in the UE buffers, or the data in the relay buffer, or a combination of the two.

According to an embodiment of another aspect of the present invention, a method is provided in a communications system in which a donor node is transmitting data downlink via a relay node to a defined one of a plurality of user equipments, the relay node storing the data received from the donor node in a downlink buffer prior to transmission to the defined user equipment. The method comprises, at the relay node, sending a downlink buffer status report from the relay node to the donor node when a downlink buffered data value representing the data stored in the downlink buffer passes a threshold value.

Advantageously, sending the downlink buffer status report when a threshold value is passed introduces a level of control to the signalling process involved in sending the report, which mitigates the need to send periodic downlink buffer status reports. For example, the threshold value can be set so that it is only sent when the downlink buffer is close to becoming overloaded, in which case it may be desirable for the donor node to reduce the rate at which data is transmitted to the relay node.

The downlink buffered data value may simply represent an amount of data in the downlink buffer. Correspondingly, the threshold value may represent either a maximum or minimum amount of data which, when the amount of data in the downlink buffer exceeds or drops below, respectively, triggers a downlink buffer status report to be sent to the donor node. it may be that there are more than one threshold value, any of which could be passed to trigger the downlink buffer status report to be triggered.

Alternatively, the downlink buffered data value may represent a rate of change in the downlink buffer. Correspondingly, the threshold value may represent either a maximum rate of change, positive or negative, of amount of data in the downlink buffer with respect to time. If the amount of data in the downlink buffer is increasing quickly, it may be desirable to send a downlink buffer status report to the donor node.

The downlink buffer status report may contain information representing the amount of data in the downlink buffer, or it may contain an indication of why the report was sent. For example, an indication that the rate of filling of the downlink buffer passed an upper threshold.

Any combination of these thresholds and downlink buffered data values may be used, so that there are a number of thresholds which could be passed to trigger a downlink buffer status report to be sent to the donor node.

Preferably, embodiments of this aspect of the invention include, at the donor node, receiving the downlink buffer status report, and adjusting, based on the received downlink buffer status report, donor to relay transmission characteristics defining the transmission of data from the donor node to the relay node.

For example, it may be that the downlink buffer is becoming overloaded, by receiving data from the donor node at a faster rate than data are being transmitted to their respective defined user equipments. In order to avoid a buffer overflow, it may be desirable for the donor node to reduce the rate at which it is transmitting data to the relay node by adjusting a transmission characteristic, or reducing the bandwidth allocated to such transmission.

Preferably, in embodiments of this aspect of the invention, the data transmitted from the donor node to the relay node is transmitted in a data stream established having a set of donor-UE transmission characteristics including an indication of a user equipment as a destination for the data, and a quality of service requirement, and each data stream is allocated a QoS label from a set of QoS labels according to the quality of service requirement included in the donor-UE transmission characteristics defining that data stream.

The QoS labels are a way of grouping data streams with similar sets of transmission characteristics. This can simplify the labelling which increases signalling efficiency. Labelling the data streams in this way enables the relay node and donor node to treat data streams having different transmission characteristics separately.

QoS labels may be, for example, the QCI labels of table 1, and may indicate quality of service requirements according to table 1.

The data stream may be established at the donor node.

Data streams may be transmitted over an interface by a bearer, and can be distinguished from one another by their end points, or by some other characteristic defining the data stream, such as a quality of service requirement. Bearers carrying a data stream can be distinguished from one another by the transmission characteristics of the bearer itself or of the data streams therein. The data in the data stream may be a series of sequentially marked packets. Data packets transmitted in a stream may include some label or indication of the characteristics defining the stream. The data stream, once established, will remain established until the end of the relevant data transfer session, for example, the end of a VoIP call, the end of a file transfer over FTP.

Data streams having the same QoS label may be sent in a single radio bearer from the donor node to the relay node (across the Un interface).

Advantageously, embodiments of this aspect further comprise at the donor node, providing a threshold value based on the QoS labels of currently established data streams for use as the threshold value at the relay node, and transmitting the threshold value to the relay node.

The donor node, being responsible for establishing the data streams, may have information representing the number of currently established data streams having each QoS label. The threshold value may be calculated based on this information. For example, if there are many data streams having a QoS label indicating a guaranteed bit rate, the donor node may be reluctant to decrease the rate at which data is transmitted to the relay node, and so the threshold amount of data in the relay buffer before a downlink buffer status report needs to be sent could be set relatively large.

The donor node may calculate the threshold value, or values, each time there is a change in the number of currently established data streams according to an algorithm. Alternatively, it may be pre-loaded with a lookup table with threshold values corresponding to each combination of numbers of data streams having certain QoS labels.

In embodiments of this aspect of the present invention, the relay node may have a downlink buffer for each different QoS label of currently established data streams, or alternatively, the relay node may have a downlink buffer for each currently established data stream.

Preferred methods embodying this aspect further comprise, for each buffer at the relay node, at the donor node, providing a threshold value based on the QoS labels of currently established data streams, and transmitting the threshold value to the relay node. In this case, the downlink buffer status report is transmitted from the relay node to the donor node when a QoS label-specific downlink buffered data value passes the threshold value provided for the relay buffer having the same QoS label, the QoS label-specific downlink buffered data value representing data stored in the downlink buffer having a particular QoS label.

The QoS label-specific downlink buffered data value may represent an amount of data in the relevant downlink buffer, or it may represent, for example, a rate of change in the amount of data in the buffer. In the same way as the QoS label-specific buffered data value, the buffered data value, and the downlink buffered data value, the choice of what the value should represent will depend on the threshold against which it is being compared. The skilled person will appreciate that implementation choices applicable to one type of buffered data value and associated threshold value will be applicable to the others.

Since data streams may be grouped into radio bearers based on QoS labels for transmission, it may be that the donor node can adjust the transmission characteristics for each radio bearer individually. Therefore, receiving a report from the relay node when buffers for data streams having a particular QoS label are overflowing, or being under-used, will enable the donor node to adjust the radio resource dedicated to the relevant radio bearer.

According to embodiments of another aspect of the present invention, a communications system is provided comprising a plurality of user equipments, a relay node having a downlink buffer, and a donor node. In this system, the donor node is operable to transmit data downlink to one of a plurality of user equipments, the relay node is operable to store the data received from the donor node in a downlink buffer prior to transmission to the one of the plurality of user equipments, and, when a downlink buffered data value representing the data stored in the downlink buffer passes a threshold value, the relay node is operable to send a downlink buffer status report to the donor node.

According to embodiments of another aspect of the present invention, a relay node is provided for use in a communications system also having a plurality of user equipments and a donor node, the relay node having a downlink buffer, and being operable to receive data from the donor node for one of the plurality of user equipments, to store the data in the downlink buffer prior to transmission to the one of the plurality of user equipments, and when a downlink buffered data value representing the data stored in the downlink buffer passes a threshold value, to send a downlink buffer status report to the donor node.

According to another aspect of the present invention, a donor node is provided for use in a communications system also having a plurality of user equipments and a relay node operable to store data in a downlink buffer prior to transmission to one of the plurality of user equipments, the donor node being operable to transmit data downlink to one of the plurality of user equipments via the relay node, wherein the donor node is operable to provide and transmit to the relay node a threshold value which, when passed by a downlink buffered data value representing the data in the downlink relay buffer, triggers the relay node to send a downlink buffer status report to the donor node.

The skilled reader will appreciate that features of embodiments of the invention as described or claimed may be readily combined with features of other embodiments. In particular, the communications system, relay node, donor node, or other apparatus as described may have the means or functionality to perform the described methods.

Preferred features of the present invention will now be described, purely by way of example, with reference to the accompanying drawings, in which:—

Figure 1:
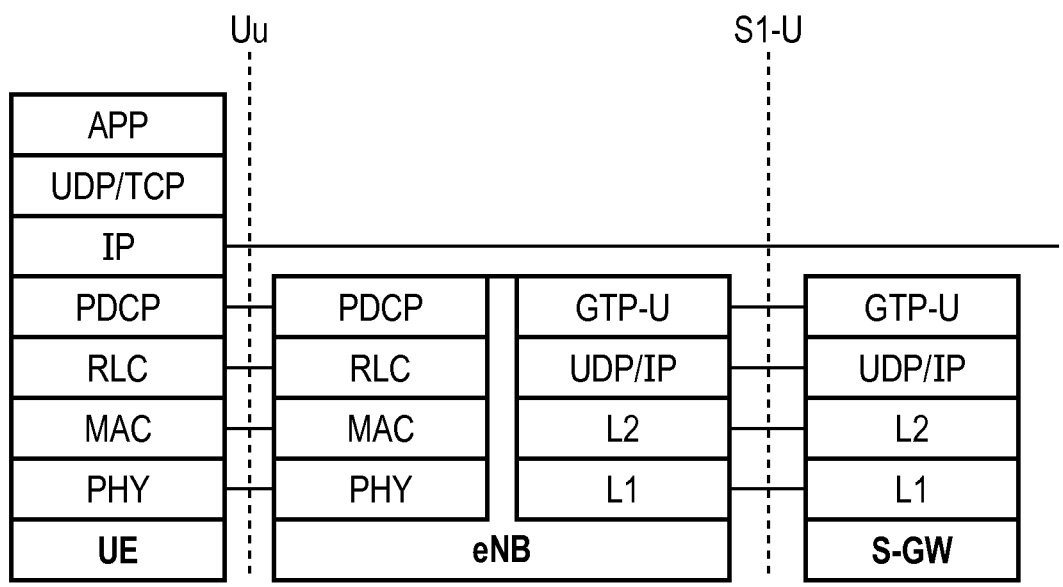
FIG. 1 shows the relationship between protocol layers for LTE.
Figure 2:
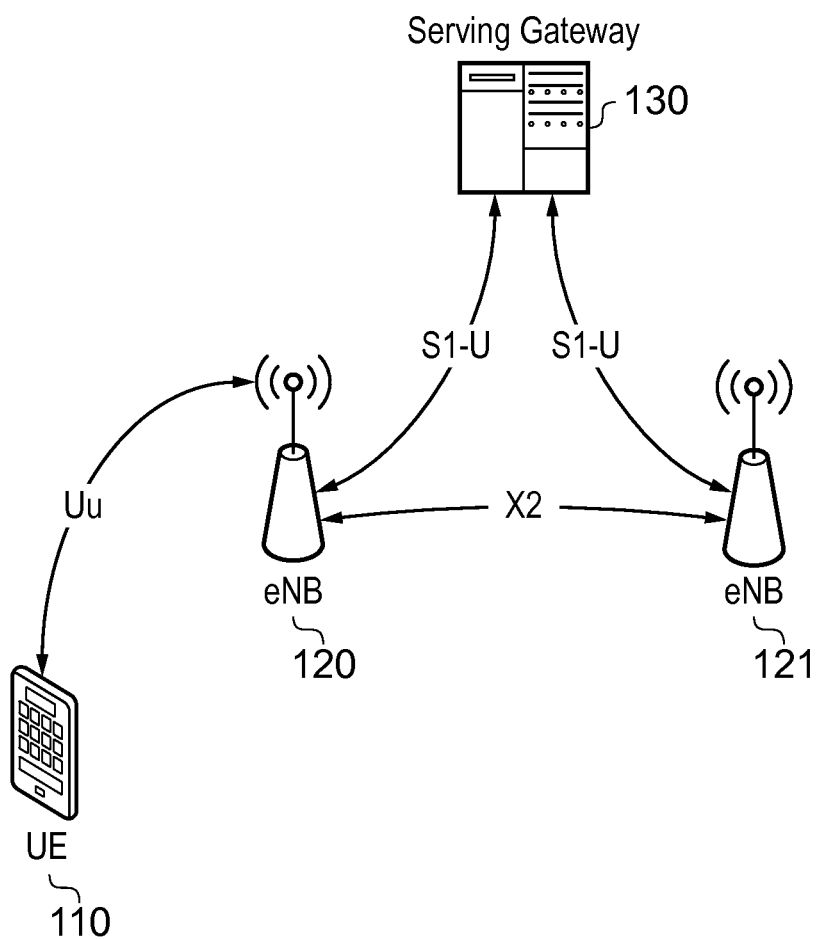
FIG. 2 shows a simple network architecture for LTE.
Figure 3:
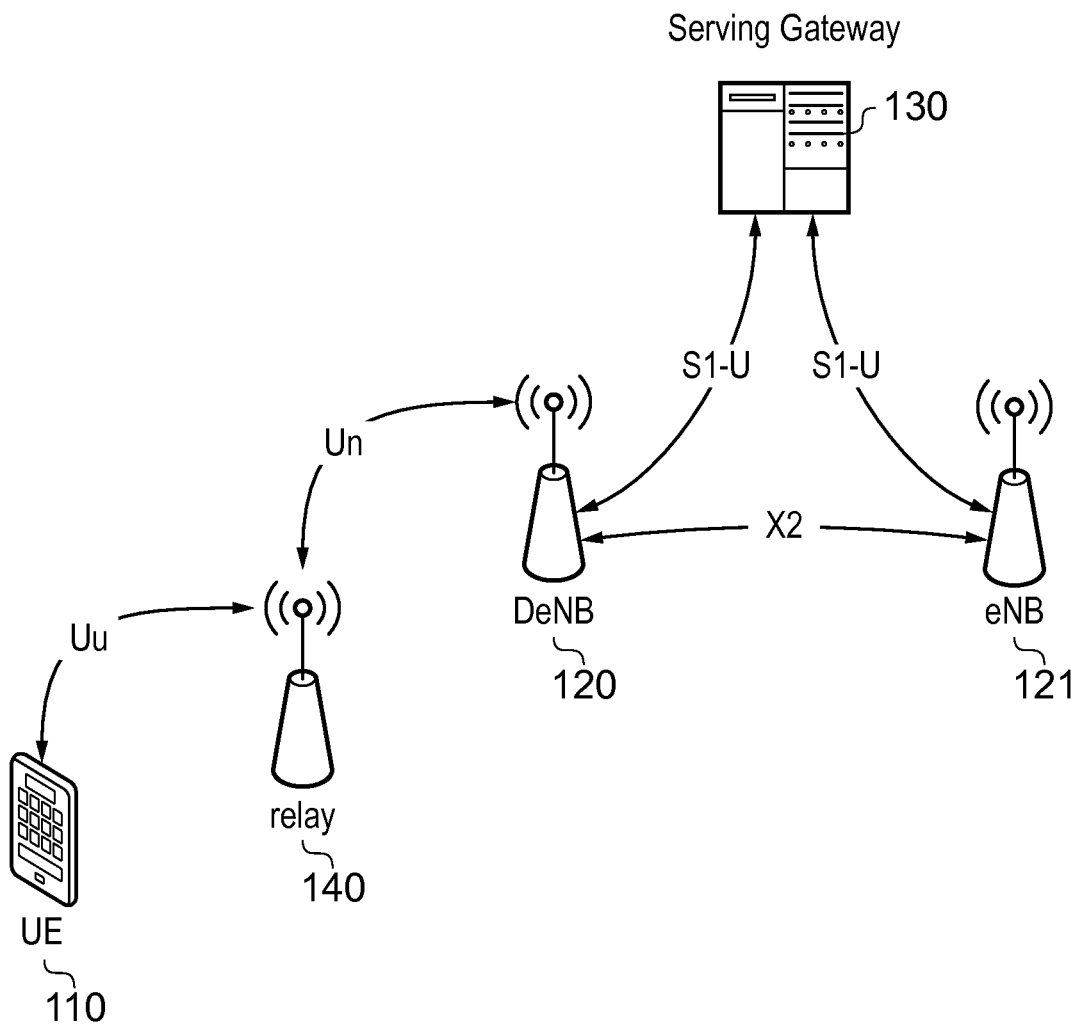
FIG. 3 shows an LTE-A network architecture including a relay node.
Figure 4:
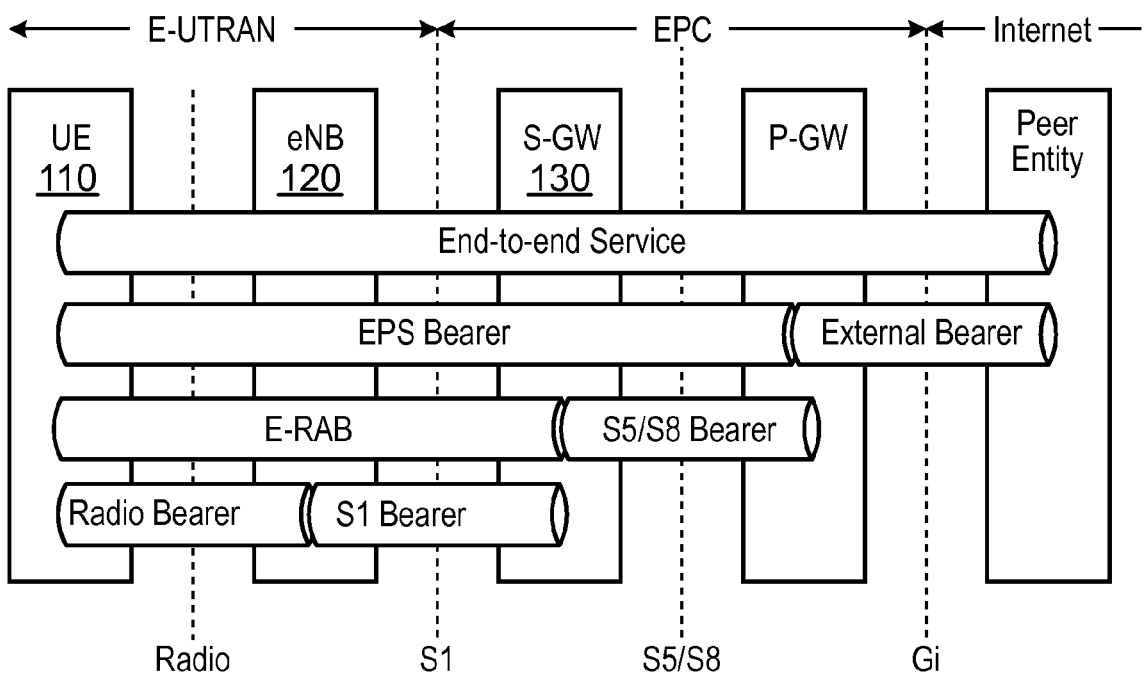
FIG. 4 shows the use of bearers in a conventional LTE/System Architecture Evolution (SAE) system.
Figure 5:
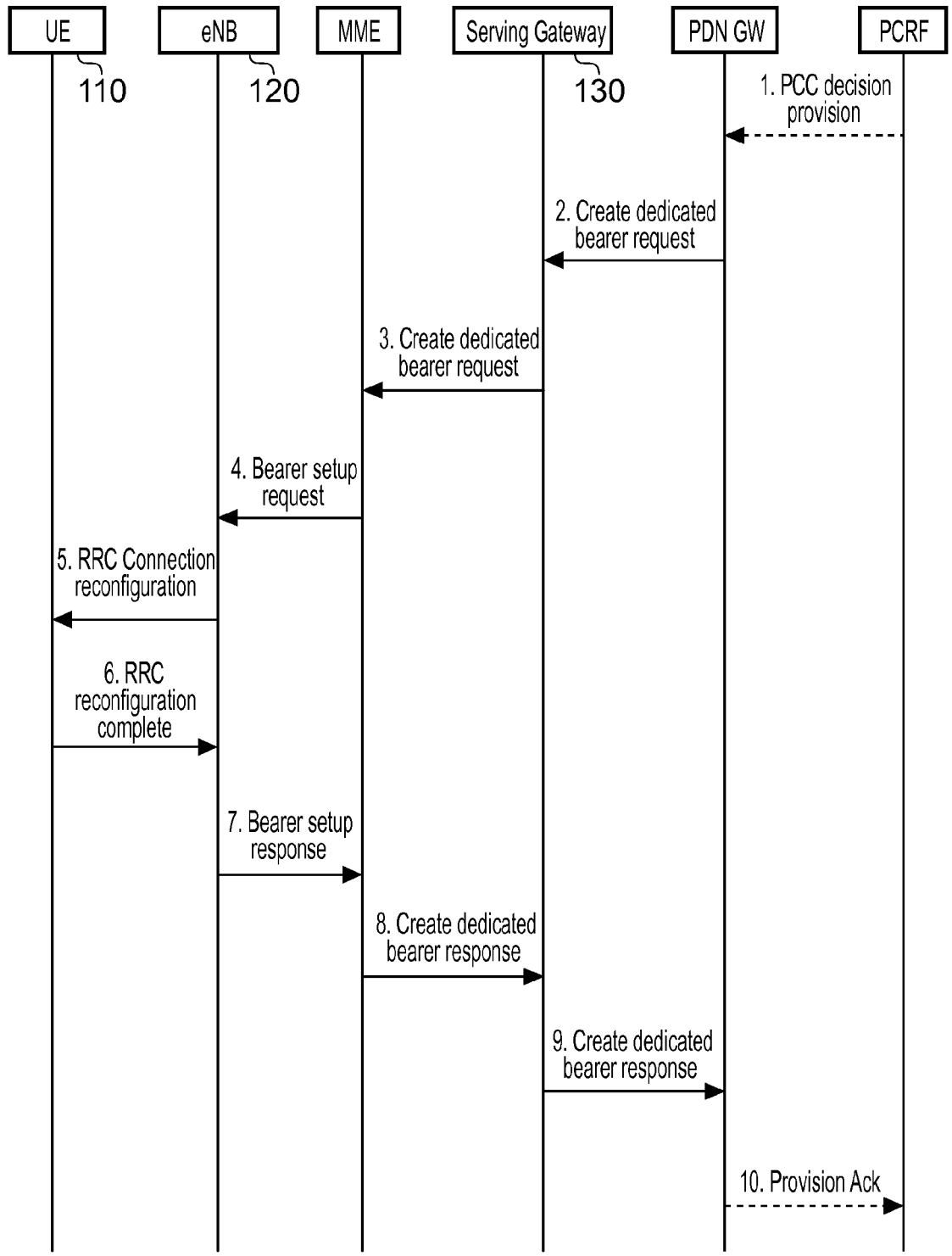
FIG. 5 shows the exchange of messages in establishing a bearer in an LTE/SAE system.
Figure 6:
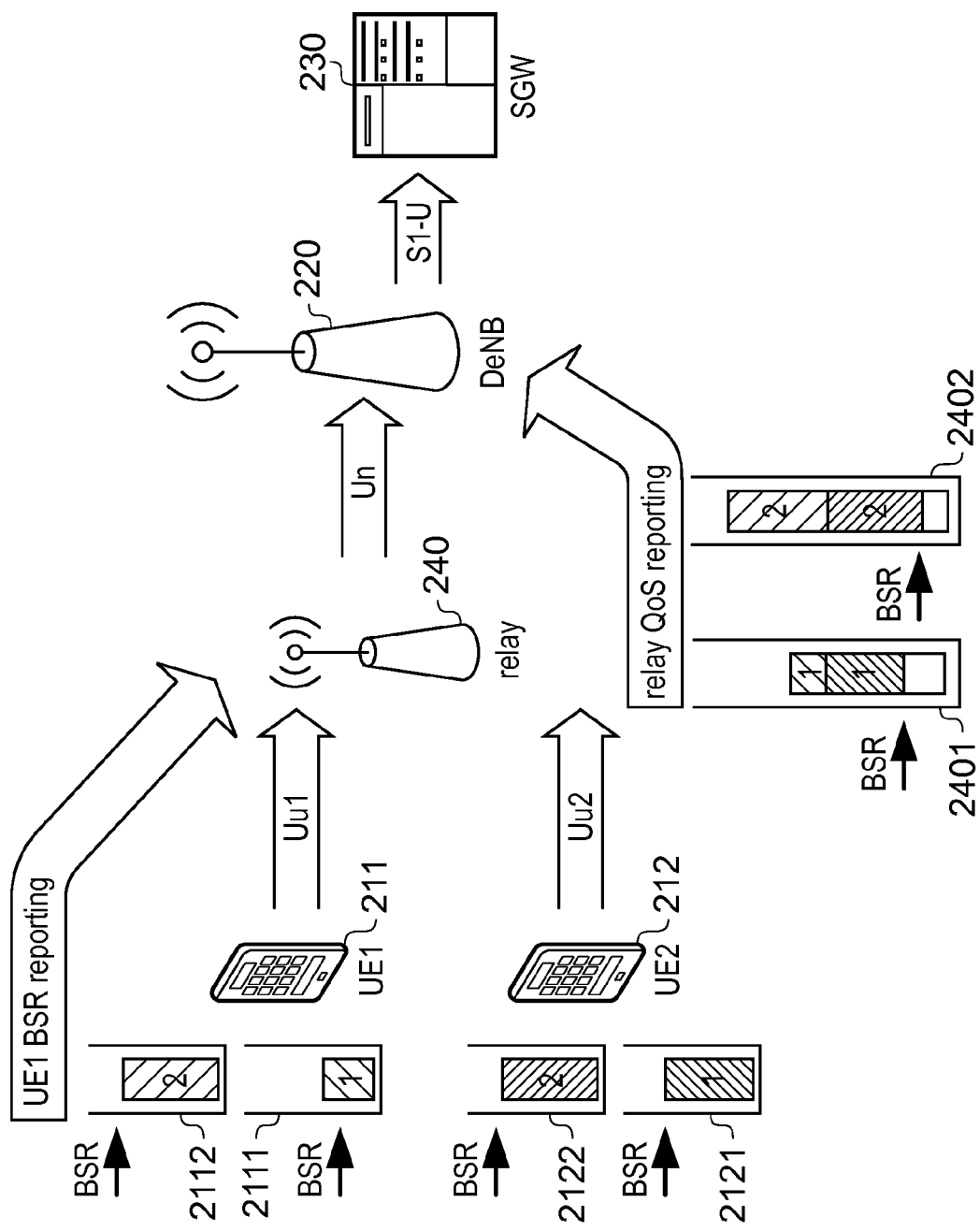
FIG. 6 is a schematic representation of reporting according to a method embodying the present invention.

In FIG. 6 a communications system is shown having two user equipments 211, 212, a relay 240 (relay node), a DeNB 220 (donor node), and a serving gateway 230. The first user equipment 211 has a UE buffer 2111 for a data stream having been established with a set of transmission characteristics given the QoS label '1', and a UE buffer 2112 for a data stream having been established with a set of transmission characteristics given the QoS label '2'. Correspondingly, the second user equipment 212 has a UE buffer 2121 for a data stream having been established with a set of transmission characteristics given the QoS label '1', and a UE buffer 2122 for a data stream having been established with a set of transmission characteristics given the QoS label '2'. The blocks within the buffers represent the data stored therein.

The relay node 240 has a relay buffer 2401 for data in data streams having been established with a transmission characteristics given the QoS label '1', and a relay buffer 2402 for data streams having been established with transmission characteristics given the QoS label '2'. Again, the blocks within the buffers represent the data stored therein.

In this example, the data streams originate at the user equipments 211, 212, and their transmission characteristics will designate the donor node 220 as their destination. However, the streams of data may be multiplexed into a larger stream, for example, for transmission of data from the relay node 240 to the donor node 220. The data streams will include information indicating the user equipment from which they originate, so that at the donor node 220 individual data streams can be identified in the received multiplexed data stream. The same applies to embodiments in which the data streams are transmitted via radio bearers.

In FIG. 6, the Un radio interface is crossed by a bearer marked Un. This Un bearer may contain several data streams in combination, multiplexed or otherwise. However, it is preferable for a separate radio bearer to exist for each QoS label, so that radio resources allocated to transmission of data streams with different QoS labels can be adjusted separately from one another.

The Uu interfaces are marked Uu1 and Uu2, wherein Uu interfaces can be considered on a per-user equipment basis. Since the data streams in the first user equipment 211 have different QoS labels and hence different QoS requirements, a separate Uu radio bearer will be used for each data stream in transmitting the data to the relay node 240. The transmission characteristics of the radio bearers will reflect those of the data streams, but the start and end points may be different. The same applies to the data streams from the second user equipment 212. The individual data streams are not represented in FIG. 6, other than at the UE buffers 2111, 2112, 2121, 2122, and at the relay buffers 2401, 2402.

At the relay node, the data streams from each of the user equipments 211, 212 are placed in buffers according to QoS label. However, the data from each user equipment are distinct from one another as the data streams include an indication of the user equipment from which they originate. The data are then transmitted to the donor node over the Un interface via a Un radio bearer per QoS label. The transmission characteristics used for the Un radio bearer will depend on the QoS labels of the currently established data streams therein.

The height of the BSR; arrows in FIG. 6 represents the contribution from each buffer to a total buffered data value/transmission value; the greater the height the greater the value. A UE buffer status report may be sent from either of the user equipments 211, 212 to report to the relay node 240 an amount of data in the user equipment's respective buffers. The relay node is then able to combine these UE buffer status reports with a value indicating the amount of data in each of the relay buffers 2401, 2402 to produce a buffered data value for comparison with a threshold. Once the threshold is passed, the relay node sends a relay buffer status report to the donor node 220.

Figure 7:
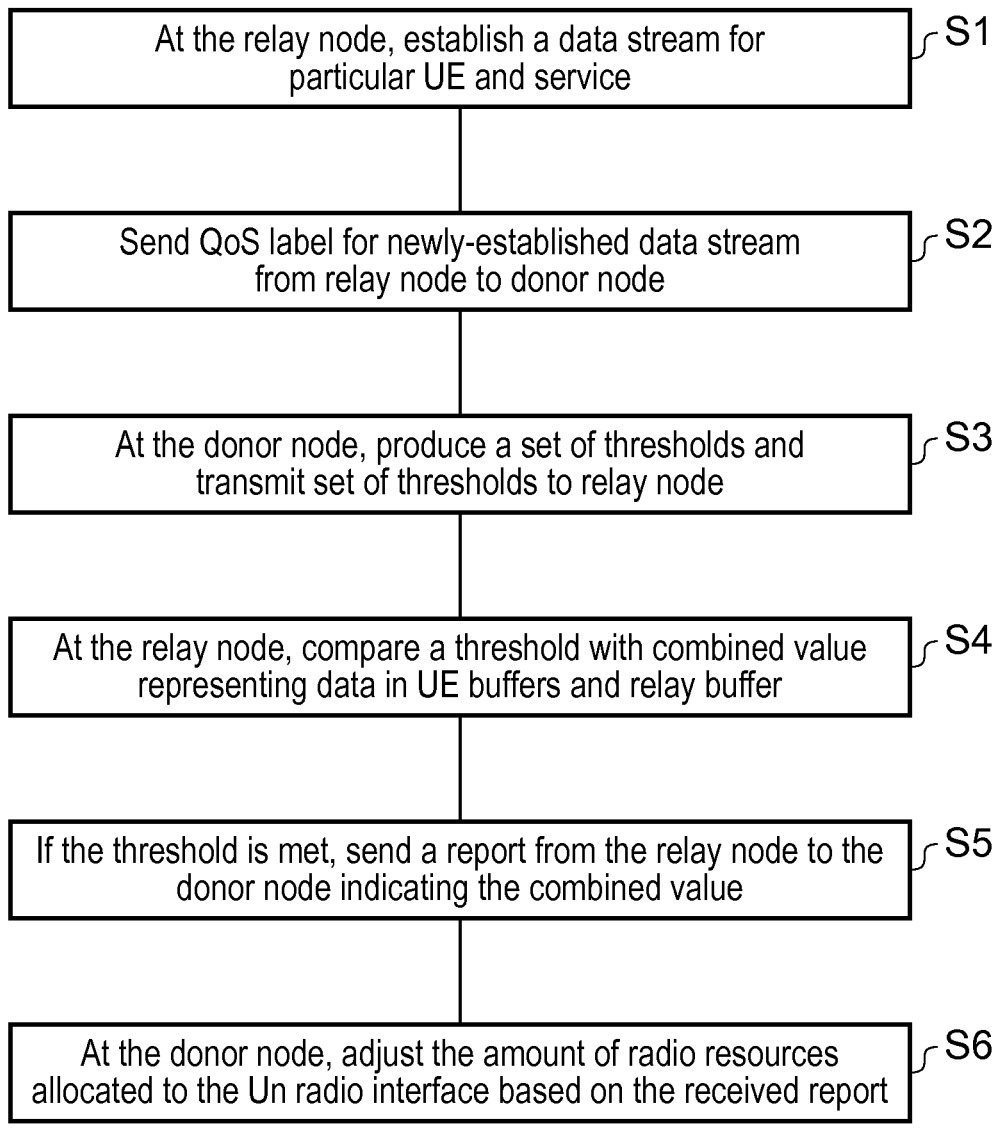
FIG. 7 is a flowchart representing an embodiment of the present invention.

FIG. 7 is a flow chart representing a method embodying the present invention. In step S1, a data stream is established at the relay node 240 for a particular user equipment 211, 212 and service. The data stream is established by defining a set of transmission characteristics, which may indicate the donor node 220 as the end point of the data stream.

In step S2, for each data stream that is established, a QoS label (which could be the same as the QoS class identifier (QCI) information) is transmitted from the relay node 240 to the donor node 220 that the relay is connected to via the Un interface. Thus, the information that is required at the relay to communicate with the user equipments 211, 212 connected to the relay 240 is also available in some (perhaps reduced in size) way to the donor node 220. For example, the relay node 240 may be aware of the full set of transmission characteristics for each currently established data stream going via the relay node 240, whereas the donor node 220 may only be aware of the QoS labels of those data streams.

In step S3, a set of thresholds for the reporting of the amount of buffered data for the different QoS labels is sent to the relay node 240 from the donor node 220 so that the donor node 220 defines the thresholds for the relay buffer status threshold reporting. The thresholds may be calculated according to some pre-determined algorithm, or the donor node may store a lookup table in which combinations of numbers of data streams per QoS label are linked to a particular set of thresholds. The set of thresholds may comprise one or more thresholds for each of the different QoS labels of currently established data streams. Alternatively, the set of thresholds may comprise one or more thresholds for each possible QoS label regardless of whether any currently established data streams in the communications system have that QoS label.

Step S3 could be performed at another point in the process, and may not be in set sequence in relation to the other steps. For example, the thresholds may be set periodically based on current information held at the donor node. Alternatively, the thresholds may be set only once when a relay is installed in the network. The threshold linked to a particular QoS label may be provided whenever there is a change in the number of data streams having that QoS label. Alternatively, the thresholds may be based on the proportion of data streams having a particular QoS label of the total number of data streams, rather than on the number of data streams itself.

The relay node 240 combines the amount of data in the UE buffers 2111, 2112, 2121, 2122 with the amount of data in the relay buffers 2401, 2402 to produce a combined value. In this example, the relay node 240 produces a combined value for each of the different QoS labels, based on the amount of data in buffers for data streams having the QoS label in question. In step S4, the combined values are compared with a relevant threshold from the set of thresholds (according to QoS label).

In step S5, when one of the thresholds is passed, a relay buffer status report is sent from the relay node 240 to the donor node 220. The relay buffer status report should at least contain an indication of the identity and magnitude of the combined value that exceeded its threshold. The relay buffer status report may include details of more than one combined value.

In step S6, the received report is used by the donor node 220 to adjust the amount of radio resources allocated to the Un radio bearer carrying data streams having the QoS label for which the threshold was passed.

Figure 8:
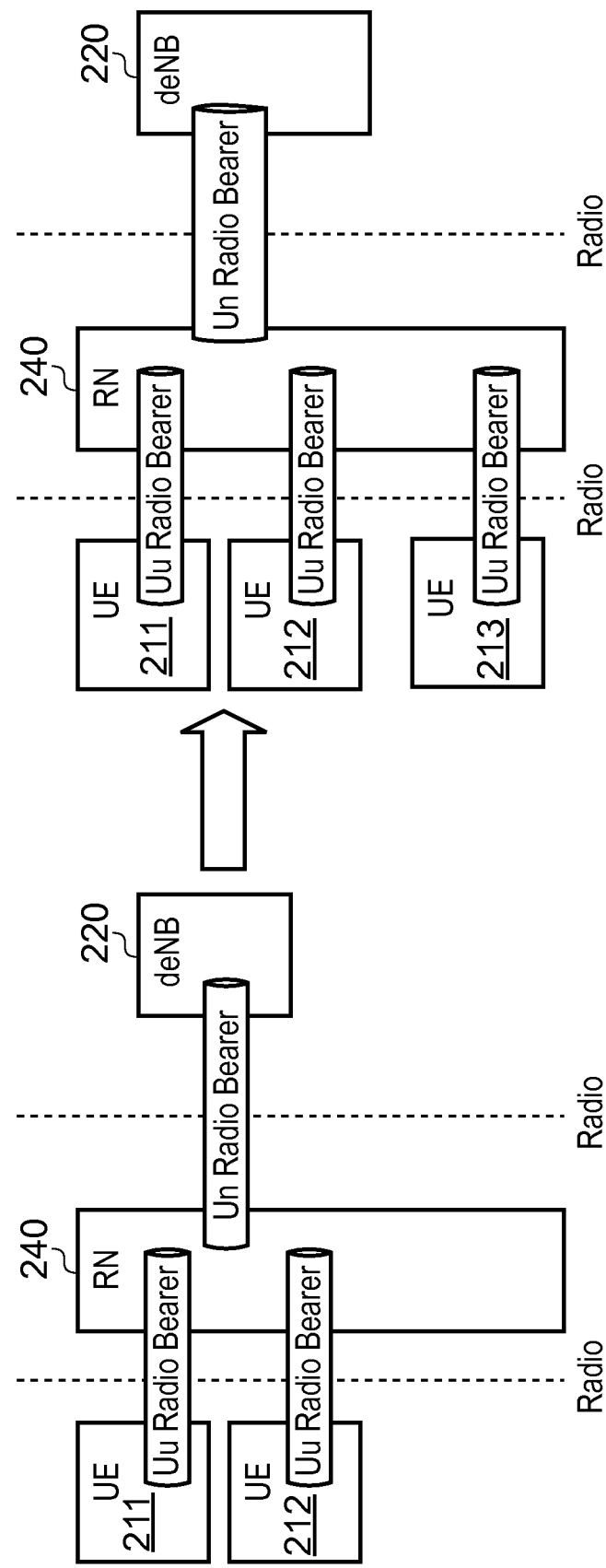
FIG. 8 is a schematic representation of radio bearers in an embodiment of the present invention.

FIG. 8 illustrates an adjustment in radio resources allocated to the Un radio bearer, which is the set of transmission characteristics defining the transmission of data from the relay node 240 to the donor node 220.

In the first configuration in FIG. 8, to the left of the arrow, user equipments 211, 212 each have a Uu radio bearer via which they are transmitting data to the relay node 240. For the sake of simplicity in this example, we shall consider the case where each Uu radio bearer is transmitting data in a single data stream only, and the single data stream in each case has the same QoS label. Hence, all the data arriving at the relay node 240 has the same QoS label, and there is only a single Un radio bearer. For example, each of the user equipments 211, 212 may be involved in a voice call. At the relay node 240 the data from these data streams are buffered into a single buffer, because the relay node 240 has a relay buffer for each QoS label, and both data streams have the same QoS label. The data from the relay buffer are transmitted to the donor node 220 across the Un radio interface via the Un radio bearer. The Un radio bearer is a defined set of transmission characteristics dedicated to carrying data streams with a particular QoS label, and has a small bandwidth in the first configuration.

In the second configuration, to the right of the arrow, a third user equipment 213 has joined the communications system and established a data stream for transmitting voice data to the donor node 220. The data are transmitted firstly to the relay node via a Uu radio bearer. Since user equipment 213 is also transmitting voice data, in this example, the data stream for the voice data from user equipment 213 has been given the same QoS label as the data streams from user equipments 211 and 213, and hence is sent in the same Un radio bearer to the donor node 220.

Recalling step S2 of FIG. 7, the donor node 220 will have been informed of the QoS label of the data stream established for user equipment 213. The donor node 220 may have then, in response to the increase in the number of user equipments with established data streams having the same QoS label, reduced the threshold relating to that QoS label. Between the first and second configurations, the reduction in the threshold has caused the threshold to be passed, and a relay buffer status report to be transmitted from the relay node 240 to the donor node 220 (steps S4, S5 from FIG. 7). Then, as in step S6 of FIG. 7, the donor node 220 increased the bandwidth dedicated to the Un radio bearer leading to the increase in size of the Un radio bearer for the QoS label in question in the second configuration compared to that of the first configuration.

Figure 9:
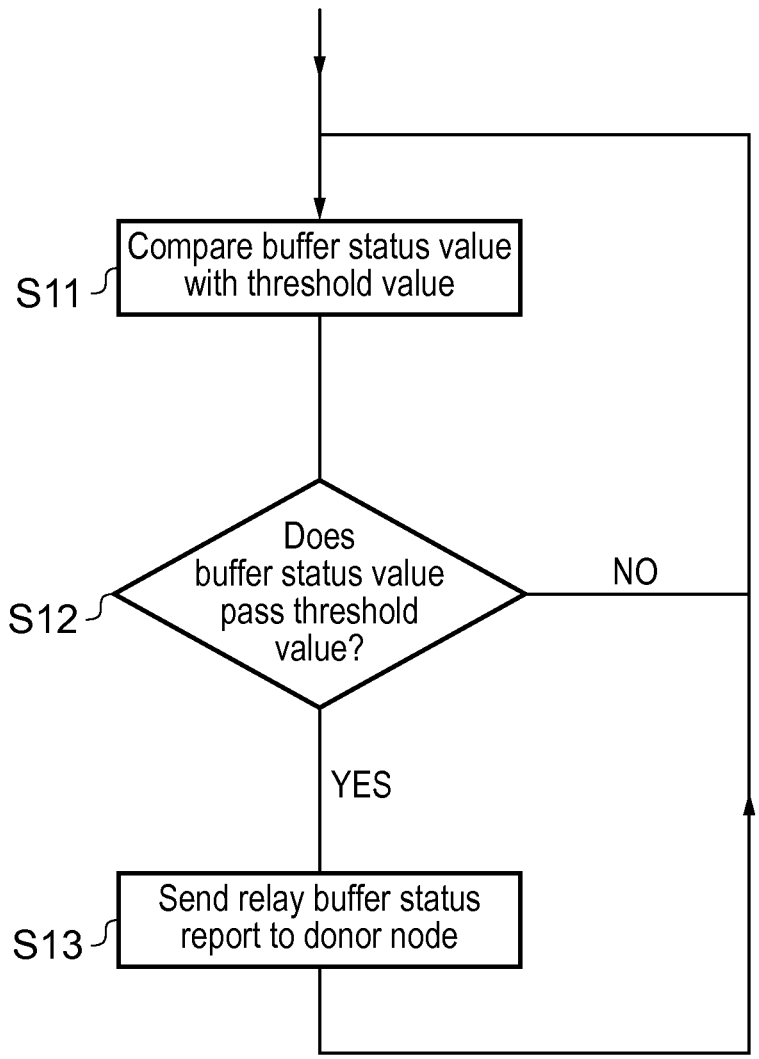
FIG. 9 is a flowchart representing an embodiment of the present invention.

FIG. 9 is a flowchart representing a method embodying the present invention. The steps in FIG. 9 are performed at the relay node 240. In step S11 the buffer status value is compared with a threshold value. As discussed previously, the buffer status value and the threshold value could take a number of forms. In this example, consider that the buffer status value represents a total amount of buffered data in the UE buffers and the relay buffer for data streams having a particular QoS label. The threshold value has been set by the donor node 220 and is, for example, an upper threshold on the amount of data from data streams having that QoS label that should be stored in the buffers before a relay buffer status report is sent to the donor node 220.

In step S12, the result of the comparison (either the threshold value is passed, or not passed) is established, and if no, the threshold value was not passed, the flow returns to step S11, so that there is continued monitoring of the threshold values. If the threshold value is passed, the flow continues to step S13 in which the relay buffer status report is sent to the donor node 220. The relay buffer status report may include an indication of the amount of data in the buffers for data streams having the particular QoS label that triggered the report to be sent.

Figure 10:
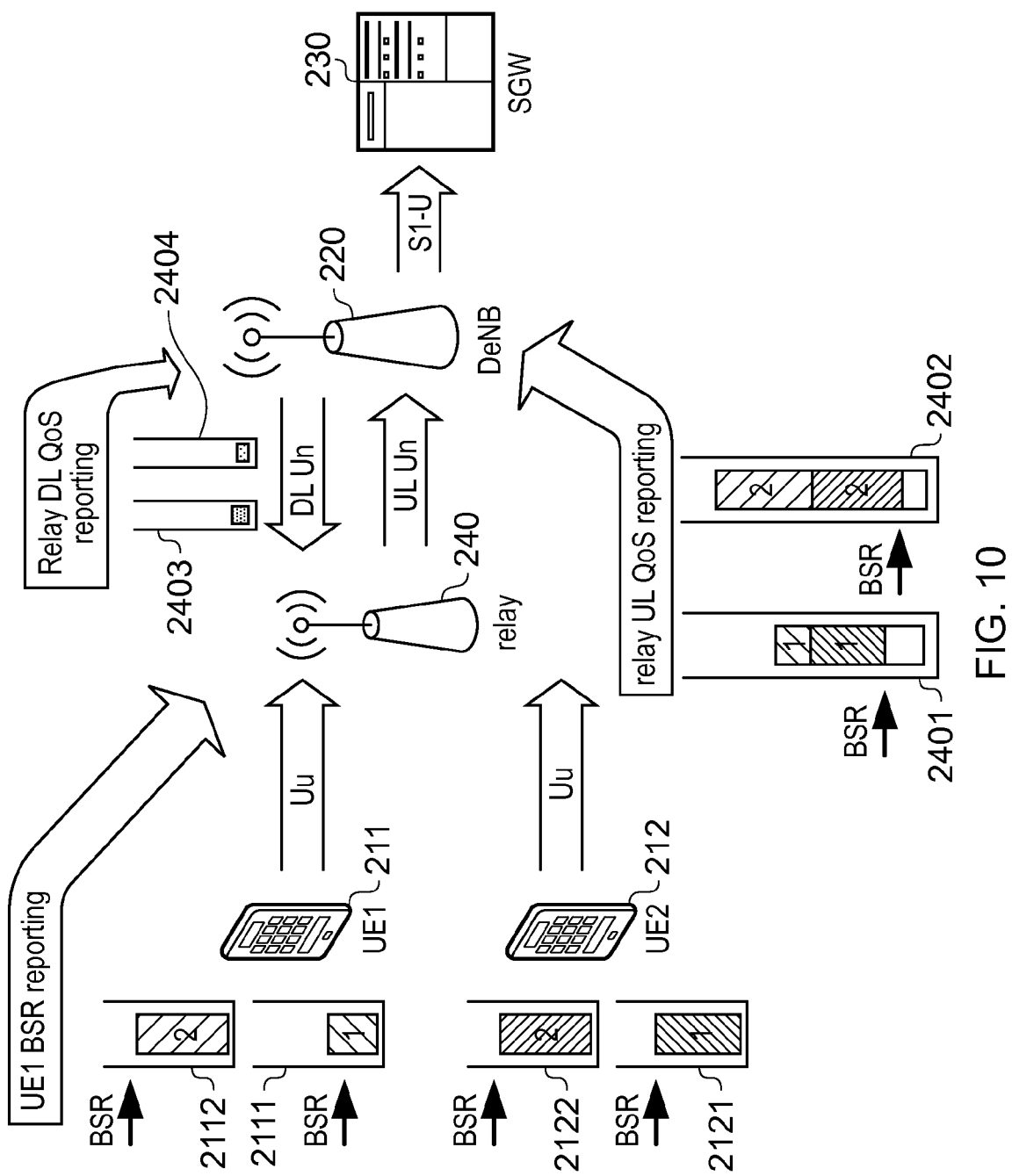
FIG. 10 shows a schematic representation of reporting in the present invention.

FIG. 10 is a schematic representation illustrating some reporting according to methods embodying the present invention. The scenario depicted in FIG. 10 is largely the same as that in FIG. 6, so only those points of difference between the two Figures shall be discussed in detail here.

The relay node 240 has downlink buffers 2403 and 2404 for storing data prior to transmission to user equipment.

The arrow marked DL Un illustrates the direction of data transmitted across the Un interface from the donor node 220 to the relay node 240. Data transmitted from the donor node 220 to the user equipments may be transmitted in data streams having defined transmission characteristics such as start and end points, and quality of service requirements. The quality of service requirements may be indicated by a QoS label which may be the same as the QCI labels in table 1, or could be according to some other system of summarising QoS requirements. Data streams having the same QoS label are grouped and transmitted from the donor node 220 to the relay node 240 in a radio bearer having transmission characteristics corresponding to the data streams they are carrying. For example, voice data destined for user equipment 211 and voice data destined for user equipment 212 may be transmitted in separate data streams, but in a single Un radio bearer from the donor node 220 of the relay node 240 (assuming the data streams have the same QoS label in each case).

At the relay node 240, there may be a separate downlink buffer for each data stream, so that the voice data destined for user equipment 211 are stored in a separate buffer from the voice data destined for user equipment 212. If user equipment 211, for example, is also downloading a file via FTP, this will be in a data stream having a different QoS label and will therefore have a separate downlink buffer at the relay node 240 prior to transmission to the user equipment 211.

Downlink merely denotes a direction of transmission of data in the network architecture, namely, towards the user equipment.

Thresholds, possibly pre-signalled by the donor node 220 and transmitted to the relay node 240, for downlink buffers for each QoS label are compared at the relay to the data in the downlink buffers 2403, 2404. For example, if the threshold is an upper threshold on the amount of data that can be stored in a downlink buffer for a data stream of a certain QoS label, then the amount of data in the downlink buffers 2403, 2404 for data streams of that QoS label are compared with the threshold. If the threshold is passed, a downlink buffer status report is sent from the relay node 240 to the donor node 220 indicating the amount of data in the downlink buffer in question.

As previously discussed, thresholds could also be lower limits, or linked to rates of change of data levels in a buffer.

The thresholds may be set on a per buffer basis, so that any buffer meeting a threshold triggers a downlink buffer status report. Alternatively, the buffer may be set for a combination of downlink buffers used for data streams having a particular QoS label. The radio resources dedicated to the radio bearer from the donor node to the relay node carrying data in data streams having that QoS label can then be adjusted. For example, if the amount of data in one or all of the buffers being used for data streams having QoS label '1' is too high, there is a risk of buffer overrun. The threshold value (set by the donor node) will be passed, a downlink buffer status report sent to the donor node, and the bandwidth allocated to the relevant Un radio bearer reduced to slow the rate of arrival.

Although different aspects of this invention have been presented separately, it should be appreciated that features of different aspects can be combined. For example, the thresholds discussed for data in relay buffers could be applicable to downlink buffers. Furthermore, where a feature is discussed as a method, it should be understood that equipment having the means and functionality to perform the method is implicitly disclosed.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A method in a communications system in which a plurality of user equipments are transmitting data uplink to a donor node via a relay node, the plurality of user equipments each storing the data in its own UE buffer prior to transmission to the relay node, the relay node storing the data received from the plurality of user equipments in a relay buffer prior to transmission to the donor node, the method comprising:
at the relay node, sending a relay buffer status report from the relay node to the donor node when a buffered data value passes a threshold value; wherein
the buffered data value represents either data stored in the UE buffers or data stored in the relay buffer;
the data transmitted from each of the plurality of user equipments to the relay node is transmitted in a data stream established having a set of UE transmission characteristics for the data stream, including a quality of service requirement, the method further comprising:
for each new data stream, defining the set of UE transmission characteristics; and
at the relay node, for each set of UE transmission characteristics, selecting a QoS label from a set of QoS labels according to the quality of service requirement of the new data stream;
transmitting the QoS label from the relay node to the donor node as information representing the defined set of UE transmission characteristics;
at the donor node, providing the threshold value based on the QoS labels of currently established data streams for use as the threshold value at the relay node; and
transmitting the threshold value to the relay node.

2. The method according to claim 1, wherein
the buffered data value represents a combination of the data stored in the UE buffers and data stored in the relay buffer.

3. The method according to claim 1, further comprising:
at the donor node, receiving the relay buffer status report, and adjusting, based on the received relay buffer status report, relay to donor transmission characteristics defining the transmission of data from the relay node to the donor node.

4. The method according to claim 1, wherein
the UE buffer for each user equipment is divided into a plurality of UE buffers dedicated to each data stream from that user equipment to the relay node, and
the relay buffer, for the relay node, is divided into a plurality of relay buffers for each different QoS label of currently established data streams.

5. The method according to claim 4, wherein
the threshold value based on the QoS labels of currently established data streams is provided for each buffer at the relay node, the donor node; wherein each threshold value is transmitted to the relay node; and wherein
the buffer status report is transmitted from the relay node to the donor node when a QoS label-specific buffered data value passes the threshold value provided for the relay buffer having the same QoS label, the QoS label-specific buffered data value representing data stored in the UE data buffers dedicated to data streams having a particular QoS label, or data stored in the relay buffer having the same QoS label, or a combination of the two.

6. A communications system comprising:
a plurality of user equipments each having a UE buffer;
a relay node having a relay buffer; and
a donor node; wherein
each user equipment is operable to transmit data uplink to the donor node via the relay node, and to store the data in its own UE buffer prior to transmission to the relay node;
the relay node is operable to store the data received from the plurality of user equipments in the relay buffer prior to transmission to the donor node, and, when a buffered data value passes the threshold value, to send a buffer status report to the donor node, the buffered data value representing either the data in the UE buffers, or the data in the relay buffer; and
each of the plurality of user equipments is operable to transmit data to the relay node in a data stream established having a defined set of UE transmission characteristics for the data stream, including a quality of service requirement;
the relay node being operable, for each set of UE transmission characteristics, to select a QoS label from a set of QoS labels according to the quality of service requirement of the new data stream, and to transmit the QoS label from the relay node to the donor node as information representing the defined set of UE transmission characteristics; and
the donor node being operable to provide the threshold value based on the QoS labels of currently established data streams for use as the threshold value at the relay node, and to transmit the threshold value to the relay node.

7. A relay node for use in a communications system also having a plurality of user equipments each having a UE buffer in which to store data prior to transmission uplink to the relay node, and a donor node,
the relay node having a relay buffer, and being operable:
to receive data from each of the plurality of user equipments for transmission to the donor node,
to store the data in the relay buffer prior to transmission to the donor node, and
when a buffered data value passes a threshold value, to send a buffer status report to the donor node, the buffered data value representing either the data in the UE buffers, or the data in the relay buffer; wherein the relay node is operable to receive data from each of the plurality of user equipments, in a data stream established having a defined set of UE transmission characteristics for the data stream, including a quality of service requirement; wherein the relay node is operable, for each set of UE transmission characteristics, to select a QoS label from a set of QoS labels according to the quality of service requirement of the new data stream, and to transmit the QoS label from the relay node to the donor node as information representing the defined set of UE transmission characteristics; and wherein the relay node is operable to receive from the donor node the threshold value based on the QoS labels of currently established data streams for use as the threshold value at the relay node, and to transmit the threshold value to the relay node.

8. A method in a communications system in which a donor node is transmitting data downlink via a relay node to a defined one of a plurality of user equipments, the relay node storing the data received from the donor node in a downlink buffer prior to transmission to the defined user equipment, the method comprising:

at the relay node, sending a downlink buffer status report from the relay node to the donor node when a downlink buffered data value representing the data stored in the downlink buffer passes a threshold value; wherein the data transmitted from the donor node to the relay node is transmitted in a data stream established having a set of donor-UE transmission characteristics including an indication of a user equipment as a destination for the data, and a quality of service requirement; and wherein each data stream is allocated a QoS label from a set of QoS labels according to the quality of service requirement included in the donor-UE transmission characteristics defining that data stream, the method further comprising:

at the donor node, providing the threshold value based on the QoS labels of currently established data streams for use as the threshold value at the relay node, and transmitting the threshold value to the relay node.

9. The method according to claim 8, further comprising, at the donor node, receiving the downlink buffer status report, and adjusting, based on the received downlink buffer status report, donor to relay transmission characteristics defining the transmission of data from the donor node to the relay node.

10. The method according to claim 8, wherein the downlink buffer for the relay node is divided into a plurality of downlink buffers for each different QoS label of currently established data streams, or the downlink buffer for the relay node is divided into a plurality of downlink buffer for each currently established data stream.

11. The method according to claim 10, wherein the threshold value based on the QoS labels of currently established data streams is provided for each buffer at the relay node, at the donor node, wherein each threshold value is transmitted to the relay node; and wherein the downlink buffer status report is transmitted from the relay node to the donor node when a QoS label-specific downlink buffered data value passes the threshold value provided for the relay buffer having the same QoS label, the QoS label-specific downlink buffered data value representing data stored in the downlink buffer having a particular QoS label.

12. A communications system comprising:

a plurality of user equipments;

a relay node having a downlink buffer; and a donor node; wherein the donor node is operable to transmit data downlink to one of a plurality of user equipments; and the relay node is operable to store the data received from the donor node in a downlink buffer prior to transmission to the one of the plurality of user equipments, and, when a downlink buffered data value representing the data stored in the downlink buffer passes a threshold value, to send a downlink buffer status report to the donor node; and wherein the donor node is operable to transmit the data to the relay node in a data stream established having a set of donor-UE transmission characteristics including an indication of a user equipment as a destination for the data, and a quality of service requirement;

each data stream is allocated a QoS label from a set of QoS labels according to the quality of service requirement included in the donor-UE transmission characteristics defining that data stream; and the donor node is operable to provide the threshold value based on the QoS labels of currently established data streams for use as the threshold value at the relay node, and to transmit the threshold value to the relay node.

13. A relay node for use in a communications system also having a plurality of user equipments and a donor node, the relay node having a downlink buffer, and being operable:

to receive data from the donor node for one of the plurality of user equipments, to store the data in the downlink buffer prior to transmission to the one of the plurality of user equipments, and when a downlink buffered data value representing the data stored in the downlink buffer passes a threshold value, to send a downlink buffer status report to the donor node; wherein the relay node is operable to receive the data from the donor node in a data stream established having a set of donor-UE transmission characteristics including an indication of a user equipment as a destination for the data, and a quality of service requirement, each data stream is allocated a QoS label from a set of QoS labels according to the quality of service requirement included in the donor-UE transmission characteristics defining that data stream; and wherein the relay node is operable to receive the threshold value from the donor node, which provides the threshold value based on the QoS labels of currently established data streams for use as the threshold value at the relay node.

* * * * *